United States Patent

[11] 3,573,847

| [72] | Inventor | Giorgio Sacerdoti<br>Milan, Italy |
|---|---|---|
| [21] | Appl. No. | 852,987 |
| [22] | Filed | Aug. 22, 1969 |
| [45] | Patented | Apr. 6, 1971 |
| [73] | Assignee | Olivetti-General Electric S.p.A.<br>Caluso(Torino), Italy |
| [32] | Priority | Oct. 22, 1964 |
| [33] | | Italy |
| [31] | | 22739/64<br>Continuation of application Ser. No.<br>501,950, Oct. 22, 1965, now abandoned. |

[54] CHARACTER RECORDER
6 Claims, 6 Drawing Figs.

[52] U.S. Cl. ........................................... 346/76,
346/108, 95/4.5
[51] Int. Cl. .................................................. G06k 15/02
[50] Field of Search .......................................... 346/108,
76; 178/6.6, 6.7, 7.4, 15; 95/4.5

[56] References Cited
UNITED STATES PATENTS

| 2,713,822 | 7/1955 | Newman | 346/76X |
|---|---|---|---|
| 2,769,379 | 11/1956 | Peery | 95/4.5 |
| 2,792,448 | 5/1957 | Deuth et al. | 178/7.6 |
| 2,931,022 | 3/1960 | Triest | 340/324 |
| 2,937,283 | 5/1960 | Oliver | 178/15X |
| 2,939,009 | 5/1960 | Tien | 250/65 |
| 3,207,897 | 9/1965 | Limberger | 250/65 |
| 3,266,393 | 8/1966 | Chitayat | 95/1.1 |
| 3,348,233 | 10/1967 | Hertz | 346/76 |
| 3,349,174 | 10/1967 | Warschauer | 178/7.6 |

*Primary Examiner*—Joseph W. Hartary
*Attorneys*—George V. Eltgroth and Joseph B. Forman ABSTRACT: A recording apparatus is shown in which serial printing of characters is achieved on a radiation sensitive print medium, by means of a radiation beam, modulated and deflected so as to scan a print area and to sensitize elementary spots serially on the print medium, each character being formed by the combination of said elementary spots.

Patented April 6, 1971 3,573,847

INVENTOR
Giorgio Sacerdoti

BY George V. Eltgroth and
Joseph B. Forman
ATTORNEY

Patented April 6, 1971

INVENTOR
Giorgio Sacerdoti

BY George V. Eltgroth and
Joseph B Forman
ATTORNEY

Patented April 6, 1971

INVENTOR
Giorgio Sacerdoti

BY George V. Eltgroth and
Joseph B. Forman
ATTORNEY

CHARACTER RECORDER

This is a streamlined continuation of application Ser. No. 501,950, filed Oct. 22, 1965, now abandoned.

This invention relates to a process for recording or writing characters or signs of whatever form, on processed or not processed paper, either by continuous or interrupted lines, under control of electrical signals, by means of a reflected and modulated radiation beam, and to the means and devices for operating said process.

A great number of methods for recording or printing on previously processed paper are now in use. There are also methods for printing on unprocessed paper by the use of powders apt to be fixed by a thermal action (toners), such as these used in xerographic processes.

The process according to the invention allows the recording on whatever type of processed paper, as well as on unprocessed paper, by the use of inking means such as ribbons or sheets covered by waxes, as used in typewriting: or also by the use of toners existing in or carried into the recording zone by whatever means: or, finally, by direct carbonization of the paper surface.

The radiations used may be electromagnetic radiation of any type, namely: infrared, visible, ultraviolet or Roentgen radiation.

According to the invention, it is sufficient that the incident radiation reaches, on the point of recording, an intensity great enough to affect the paper. Papers used will be different according to the type of radiation used. For instance, an heliographic paper will be used for ultraviolet radiation, photographic paper for a visible radiation, or for Roentgen radiation, while in case of infrared radiation different types of paper and modes of recording may be used, namely:

a. The beam modulated and suitably deflected falls on a sheet or a ribbon covered by or containing suitable coloring substances, said ribbon or said sheet being disposed in front of the paper and in close contact therewith. Said ribbon or sheet are apt to transfer locally, by thermal action, said coloring substances to the paper.

b. The said beam melts locally the toner, which previously has been made to stick, by mechanical or electrostatical means to the recording zone.

c. The beam operates thermally on the paper, or in general on a recording support containing coloring substances which are modified by thermal effect, such papers or recording supports being already known in the art.

d. The beam starts a chemical reaction of the active substance of the paper, or causes microcontainers, being part of the said paper, to disrupt and spill their contents.

e. The beam operates directly on the paper, by thermal effect, carbonizing locally the surface of the paper in such a way, as to cause enough difference in coloring.

As said before, the process according to the invention may use either one or the other of two different recording methods, namely, said recording may be continuous or discontinuous, as is now explained in detail:

1. Point writing. The beam may fall or not fall on single points of a point matrix, in such a way, as to write a character, a numeral or a sign whatever. Usually a matrix with a number of points rather reduced, for instance 7×5, may be sufficient for reproducing with enough evidence any character. The beam must be very narrow or in any case accurately focalized and its intensity must be modulable by pulses.

2. Continuous-line writing. May be obtained letting the energy beam to pass through a proper mask before reaching the paper.

A distinctive advantage of the process according to the invention is to greatly decrease the inertia, the wear, the noise and other inconveniences peculiar to the mechanical devices. In fact, the recording is obtained by the simple deflection of the beam, said beam, in case of point writing, being vertically and horizontally deflected and moved along the line to be written; while in case of continuous-line writing it may be endowed only with the motion along the printing line.

This and other features of the present invention will become apparent from the following description of a preferred embodiment thereof, taken in conjunction with the accompanying drawings, in which.

As an example it is now illustrated a process, according to the invention, employing the point writing method, using unprocessed paper and typewriter-type ribbon of known model. The process is controlled by information carried by binary-coded electrical signals.

The process according to the invention provides (with reference to FIG. 1) a synchronizer indicated in the whole with 1, which will be described in detail later on. Said synchronizer has six inputs numbered from 2 to 7, apt to receive binary coded electrical signals, corresponding to $2^6$, i.e. 64 different characters of signs. Said synchronizer 1 has four more inputs; two of them, ($b$ and $c$) carry electrical signals caused by trip-limiting devices 8 and 9, as will be explained later on; other two of said inputs ($d$ and $e$) receive electrical signals from electro-optical transductors, 10 and 11, whose operation will be also explained later on.

Figure 4:
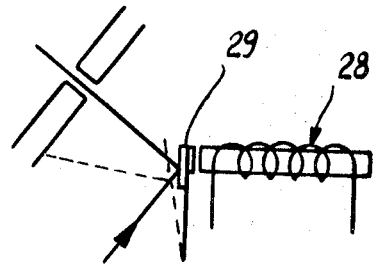
FIG. 4 shows in detail a possible manner of building an electromagnetic beam deflector.

Said synchronizer 1 has two outputs: one of them ($f$) connected to a modulator 12, the other ($k$) being intended to control the operation of reading out the characters to be printed from a memory or some equivalent device, from which said inputs 2 to 7 originate. Said synchronizer will be later on illustrated in detail, with reference to FIG. 4.

For the operation of the process according to the invention the following means are provided:

A platen 13 carries in the known manner a sheet of plain paper 14. In front of said sheet 14 a typewriting ribbon 15 is held in contact with sheet 14 by an element 16, transparent to the used radiation. The ribbon 15 is made to advance by known means. In front of the ribbon 15 there is a device for carrying reflecting means 17, said device being for instance made of a belt 18 wound upon two pulleys 19, one said pulley being held in rotation by moving means M.

As said before, two end-of-trip devices 8 and 9 are provided, said devices being for instance electrical contacts or similar means, which send out an electrical pulse to the synchronizer 1 any time that a reflecting means 17 begins to travel the space corresponding to a line of recording or when said reflecting means terminates said travel.

Figure 2:
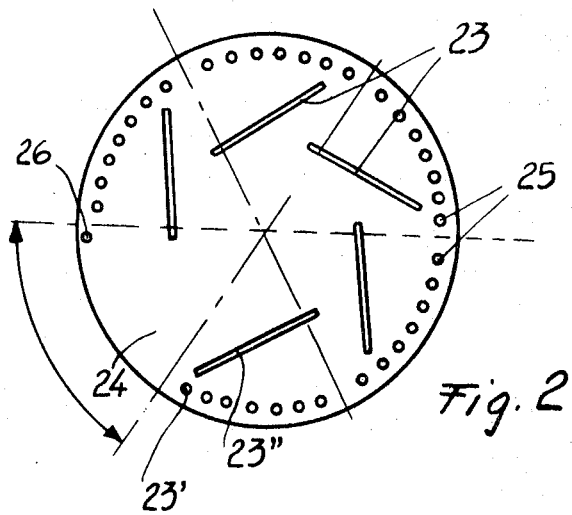
FIG. 2 shows an example of a method of vertical deflection for the beam.

The apparatus is completed by a radiation source 20, for instance a source of infrared radiation, said source being of any known and available type, having a proper energy output, and preferably, but not exclusively, consisting of a laser. The beam may have a spotlike or preferably a barlike section. In front of the beam a rotating disc 22 is moved by moving means M'. Said rotating disc (FIG. 2) carries a number of equidistant slits 23, suitably inclined and so disposed, that the beginning and the end of two neighboring slits does not superpose in reference to an incident beam having a radially disposed barlike section. The number of the slits is equal to the number of points in each horizontal line of the character writing matrix: between the first and the last slit there is a part 24 without slits, corresponding to the space between a character and the following, as it will be better explained hereafter.

At the periphery of disc 22, on the same circumference, there is a number of holes 25, at the same distance, equal to the number of points, on horizontal and vertical lines, of a complete character matrix. Said holes occupy the whole arc of said circumference, corresponding to the angle comprising said slits, but do not occupy zone 24. Immediately after the last hole of said number of holes, there is, on a different circumference, another hole 26. The radiation beams pass through said holes, and falls over the electro-optics transductor 10 and 11, which are disposed, the first, on the circumference corresponding to the holes 25, and the second, on the circumference corresponding to hole 26.

Instead of a disc with a single set of slits, one disc with more than one set of slits can be provided, said sets being separated by intermediate zones, and each set corresponding to one character. Accordingly, the same disposition will be used for the holes on the same circumference, and for the single holes after the last point of each character.

As said before, the reflecting means 17 and disc 22 are continuously held in motion, being driven respectively by moving means M and M'. Their speed must have a definite reciprocal ratio. An effect, in order to record $N$ characters per second, the disc 22 must complete $N$ turns per second: while, one reflecting means 17 covering a distance $l$ equal to the length of one recording line, containing $n$ characters must employ a time equal to $n/N$, moving therefore at a speed $V=lN/n$.

At the end of each line the platen 13 operates a small swift rotation for the change of the line, controlled by a normal end-of-line control, or by the same end-of-trip control 9, the change-of-line mechanism being any one of the many types known in the art.

The beam, after passing through the disc 22 enters modulator 12, which may consist of the armature 27 of an electromagnet 28 (FIG. 4) carrying a small mirror 29, or similar means.

When the electromagnet is released, the mirror 29 reflects the beam against an opaque screen, while, when the electromagnet is energized by the control signal received through the output $f$ of the synchronizer, said mirror reflects the beam on said reflecting means 17 carried by the belt 18.

The modulator may be constructed according to any other type known by anyone skilled in the art, for instance the deviation of the beam may be obtained by Kerr or Pockel effect on polarized radiation.

It should moreover be noted that the use of a modulator of the beforesaid type will not be always necessary for the operation of the process according to the invention, as some types of known and available radiation sources may be directly modulated, for instance if a semiconductor junction laser is used, the emission of the radiation may be controlled directly by the output $f$ of the synchronizer.

In order to better explain the function of the synchronizer 1, which will be described later on, the system of point writing will now be described, for a matrix formed by five points per row and seven points per column.

Supposing that the beam has a barlike section, the bar being disposed in radial position with reference to the continuously rotating disc 22, it is clear that at a given instant the intersection of the beam with a slit 23 originates a pointlike section beam 21a. Supposing moreover that the modulator be constantly operated, said beam is reflected by the small mirror 29 and by reflecting means 17 and falls on ribbon 15. By thermal effect said ribbon 15 will mark a point on the paper.

Figure 6:
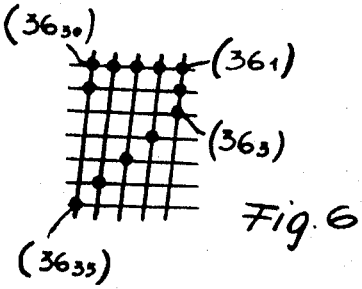
FIG. 6 shows a matrix of points for writing a character.

As the rotation of disc 22 and the translation of reflecting mean 17 continue, the point on the paper will describe a set of almost vertical lines, as shown in FIG. 6. The number of said almost vertical lines is equal to the number of the slits, and the inclination of said lines depends from the ratio between the rotation speed of the disc 22 and the translation speed of the reflecting means 17. If the modulator 12 is suitably operated by energizing and releasing at proper instants electromagnet 28, wi it will be possible to record only some selected points on each almost vertical line: for a matrix of 7×5 =35 points, only some of the seven points of each almost vertical line will be registered. In the case of the example shown in FIG. 6, in order to write the numeral seven, electromagnet 28 will be operated three times while the beam covers the first almost vertical line from the left, in correspondence with first, second and seventh horizontal row: two times (first and sixth row) for the second vertical line; two times (first and fifth row) for the third line: two times (first and fourth row) for the fourth line: three times (first, second and third row) for the fifth and last line. The operation of the modulator will happen at different instants according to the position in the matrix of the points to be recorded.

Figure 3:
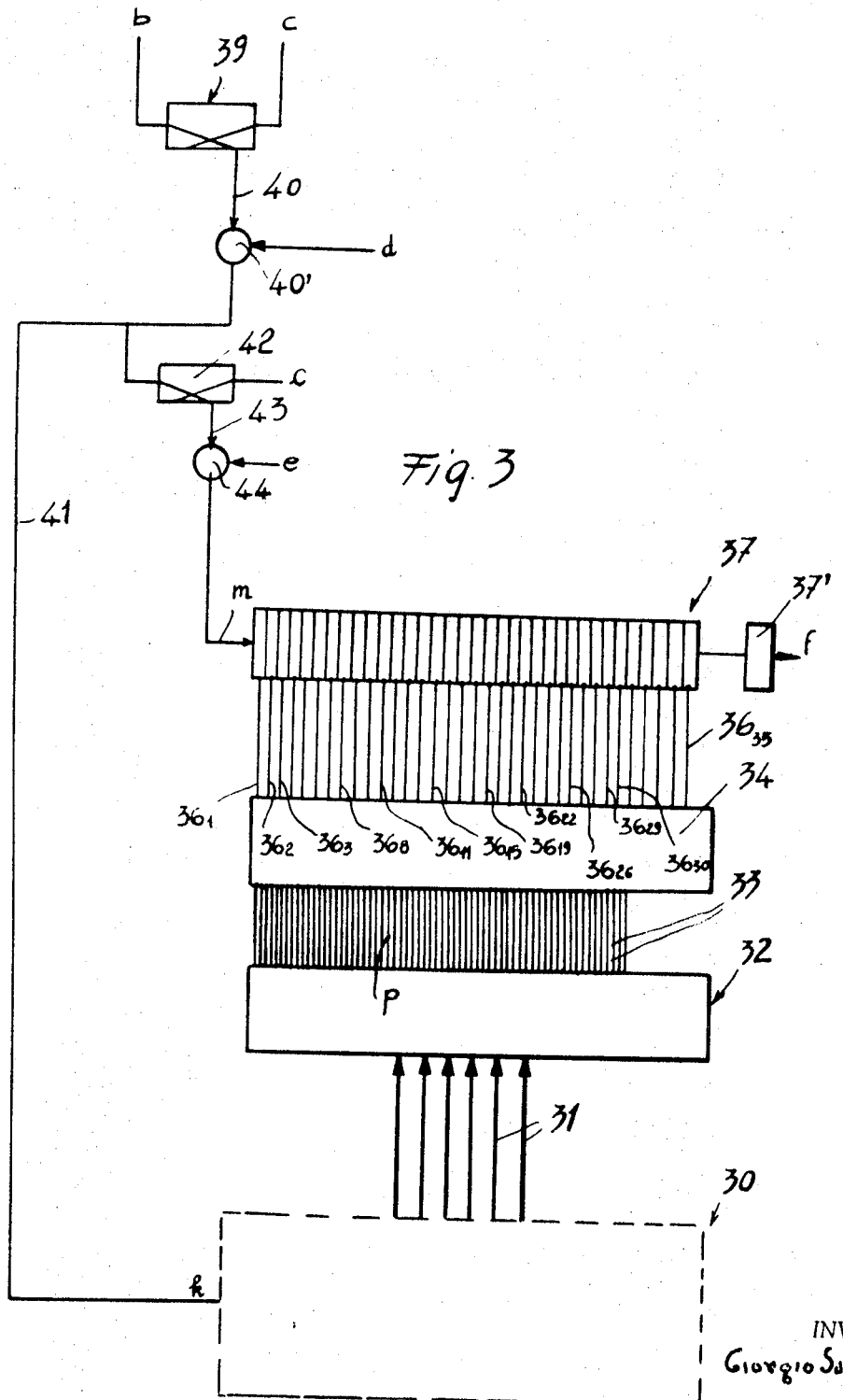
FIG. 3 is a block diagram of a synchronizer, relating to the general diagram of FIG. 1.

As an example, a possible block diagram for a synchronizer (FIG. 3), is described hereafter, supposing that the information is carried by binary coded pulses on six wires.

In the illustrated example a possible source of said information is indicated by 30, and may consist in a buffer memory of known model, as currently used in electronic computers.

Figure 1:
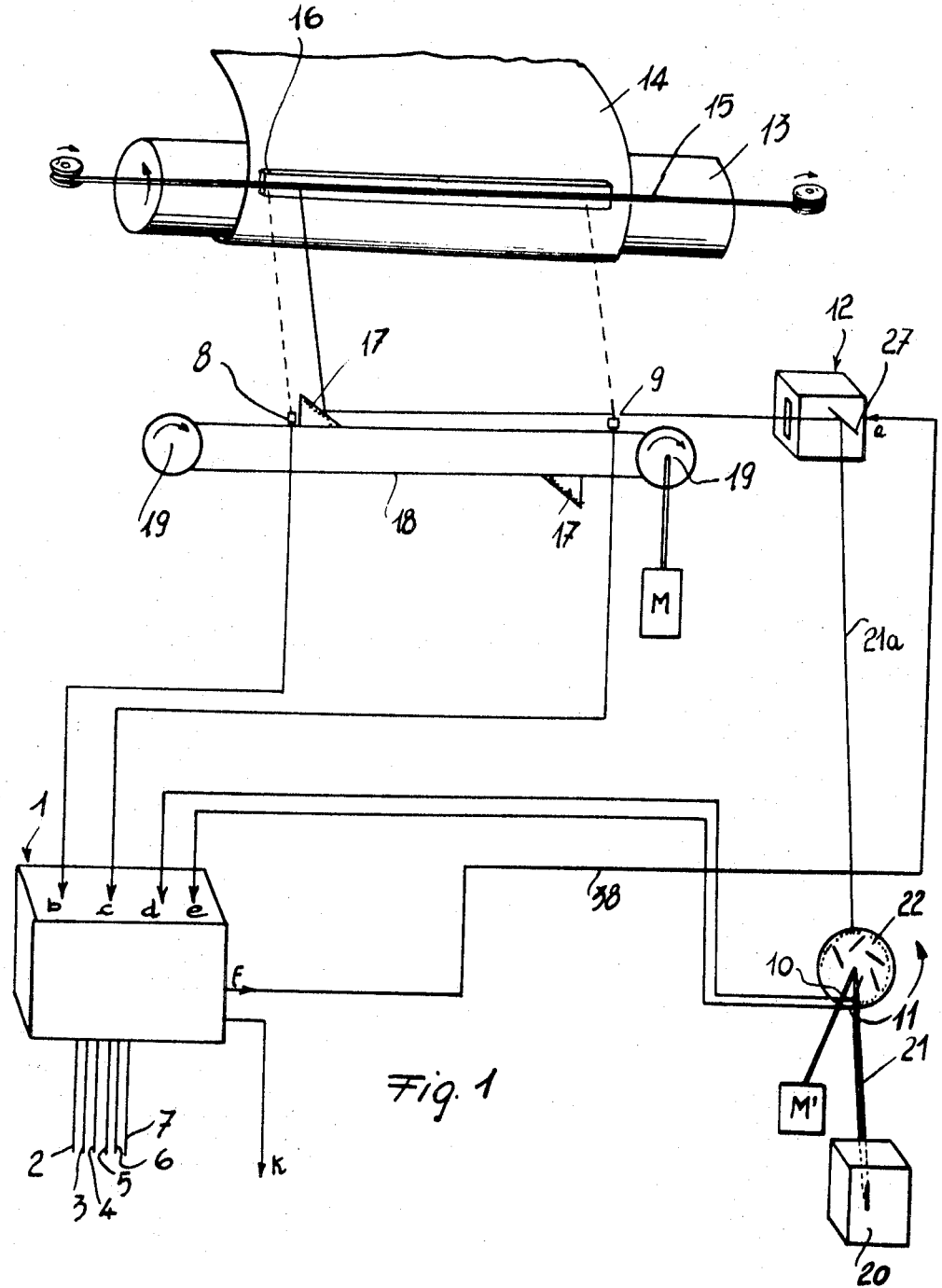
FIG. 1 shows a general diagram for the point writing of characters.

Six wires 31 connect said buffer 30 FIG. 1) to a decoding matrix 32, of the type known by people skilled in the art as an AND network.

Said decoding matrix has 64 outputs and may, for instance, be of the model consisting of suitably interconnected diodes. Its scope is to activate one and only one, of the 64 possible outputs 33 for each input combination of signals carried by wires 31 and delivered by buffer 30.

Figure 5:
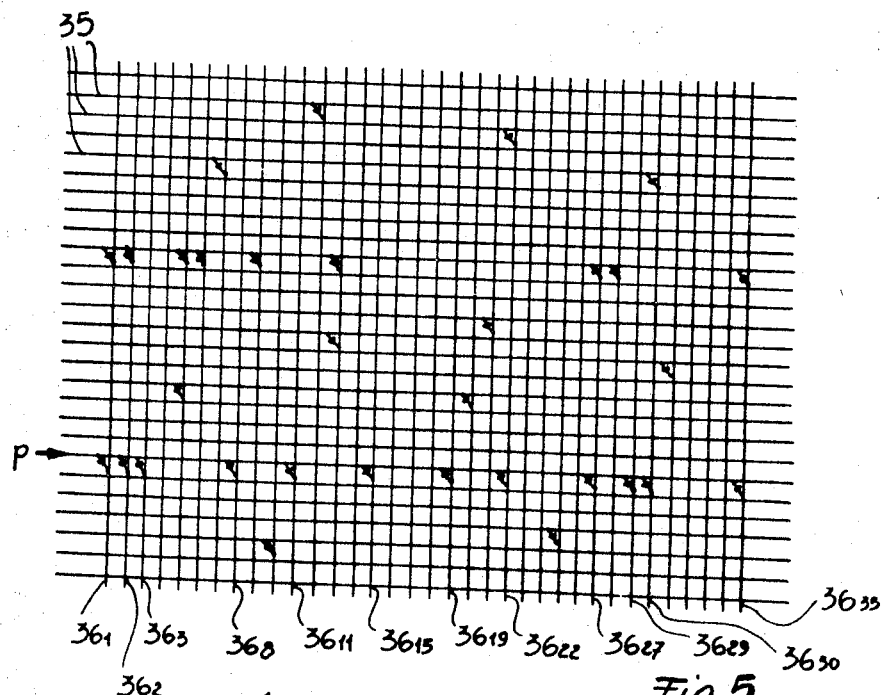
FIG. 5 shows a possible way of building the network indicated with 10 in FIG. 4.

The wires 33 are connected to a device known to people skilled in the art as a OR network, indicated by 34. A possible embodiment of an OR network with 64 inputs and 35 outputs is shown in FIG. 5. The input wires are indicated by 35 and the output wires by 36. The scope of said OR network is to deliver, for each single input signal on a input wire, a number of output signals according to a known suitable arrangement.

For instance suppose that wire $p$, one of the 64 inputs 35, is the one intended to cause the writing of numeral 7 according to FIG. 6. Said wire $p$ will be connected by suitably disposed diodes to wires $36_{35}$, $36_{30}$, $36_{29}$, $36_{27}$, $36_{22}$, $36_{19}$, $36_{15}$, $36_{11}$, $36_8$, $36_3$, $36_2$ and $36_1$, corresponding, in said order, to the three points of the first vertical line from the left; the two points of the second vertical line; the two points of the third vertical line; and the three points of the fifth vertical line, according to FIG. 6.

The 35 outputs 36 of the OR network 34 of FIG. 5 are connected to a shift register 37 of known type. Said register stores at the same time all the corresponding data on all 35 inputs, and sends them, one at a time, to modulator 12 through connection 38 (FIG. 1). Said shift register is controlled by shifting pulses sent in continuous succession to its input $m$ by proper devices described hereafter.

A pulse forming monostable multivibrator 37', is provided on the output 37 of the shift register.

With the connections, disposed as shown, between the OR network and the shift register, it is clear that the modulation will begin with the points at the lower end of the first left vertical line ($36_{35}$) and will end at the upper end of the last right vertical line. As said before, the synchronizer has four inputs $b, c, d, e$. Inputs $b$ and $c$ control a flip-flop 39 therefore activating or inhibiting an output 40, which is connected to an AND gate 41. Said AND gate 41 has an input $d$ carrying the electrical pulses coming from the electro-optical transductor 10, said pulses being used as a signal for preparing the printing of a character, and being generated by the beam traversing the hole 26 on disc 22, said hole 22 preceding, in the sense of the motion, the oz zone 24 of the disc which corresponds to the space between characters.

Output 41 of said AND gate 40 is connected to input $k$ of the buffer 30 and controls the reading out, on the six wires 31, of the signals corresponding to the character to be printed.

It is, in addition, connected to a second flip-flop 42 whose other input is parallel connected to the end-of-trip device 9.

It is, in addition, connected to a second flip-flop 42 whose other input is parallel connected to the end-of-trip device 9. Said input, when energized, inhibits the activation of flip-flop 42.

Output 43 of flip-flop 42 is connected to another AND gate 44 which receives on input $e$ the synchronizing pulses coming from transductor 11 controlled by holes 25 of disc 22. The output of the AND gate 44 controls by means of input $m$ the shifting of the shift register 37.

The operation of the said combination of means provided by the invention may be described as follows:

The beam 21 falls on disc 22, rotating at constant speed, and through hole 26 operates the electro-optical transductor 10.

The outgoing signal activates AND gate 40'. If the reflecting means 17 has already activated, by means of the end-of-trip device 8, the flip-flop 39 by input $b$, the buffer 30 will receive, through connection 41, the first signal for reading out a character. Suppose now that the character to be read is the numeral seven, as in the in the preceding example: the corresponding pulses will be sent through wires 31 in the corresponding combination of the adopted binary code. The AND network decodifies said pulse combination and activates one of wires 33 connected to the OR network (in the former example said wire is indicated with $p$).

The OR network will activate said wires $36_{35}, 36_{30}, 3 6_{29}, 36_{27}, 36_{36_{19}}, 36_{15}, 36_{11}, 36_8, 36_3, 36_2, 36$ 1. Said pulses are he in the shift register 37. In the meanwhile the disc 22 rotates, therefore presenting to the beam the zone 24 corresponding to the space between characters FIG. 2).

When the beam falls on first hole 23' on the periphery of the disc, transductor 11 is operated, and the signal generated opens the AND gate 44. Said AND gate, through input $m$, controls the shift register 37, which sends, through output $f$, the first pulse, corresponding to point $36_{35}$ to the modulator 12. Said modulator, being operated, lets the beam, which has passed through the lower portion of slit 23'', fall on the reflecting means 17 and finally on the recording means 15 therefore causing the recording of a point on the paper. The following hole 25 will again open AND gate 44 which will cause another shifting of shift register. 37. But as no signal is registered on position $36_{34}$, the modulator will not be operated. The same will again happen until the signal, corresponding to wire $36_{29}$ reaches the least position of the shift register 37, when the said signal will operate the modulator. The process will repeat itself in the same manner.

At the end of the registering line the end-of-trip device 9, through input $c$, will inhibit flip-flop 39 and 42, stopping either the modulating operations and the reading-out signals.

According to a modification of said embodiment of the process according to the invention, it is possible to obtain a continuous-line recording instead of a point-recording.

According to said modification the means adopted are substantially the same, with the exception of the disc 22. In case of the continuous-line recording said disc will carry, instead of said slits, a set of characters distributed along the circumference and formed by negative microfilm images or suitably arranged masks reproducing the signs to be registered.

The disc will rotate steadily, as in the preceding case, and the modulator will be operated by synchronizer 1 according to the letter that will be indicated by the program or the buffer store, as the one that has to be printed in correspondence of the position determined by the position of the reflecting means. In said modification said reflecting means should be motioned in jerks, instead of by a continuous motion as in the point writing disposition. Said jerks must equal the distance between a character and the following one. Each jerk will be effectuated, by known means, in correspondence of the intervals when the modulators is not operated, and, in any case, by signals delivered by the synchronizer.

According to another modification of the said invention, means may be provided for the recording of diagrams and similar drawings, under control of electronic calculators or memories.

In said case it is possible to do without any vertical deflection, as the synchronizer can operate in correlation with the change-of-line motion of the platen.

It is clear that the same type of recording can operate under control of electrical signals in function of values measured by instruments.

The means of operation of the process have been on purpose exemplified in the simplest possible way of actuation: for each particularity of operation means may be provided being functionally equivalent, but having better operating characteristics.

For instance the vertical deflection device, instead of being formed by a disc, may consist of a rotating mirror, for instance of the form of a regular polygonal prism.

As already said, the radiation beam may have a pointlike section. In this case the vertical deflection device may consist of a disc similar to the one described, but having a reflecting surface, facing a mirror in such a way, that the beam may cover, by repetitive reflection, the whole length of a slit.

It should be understood that the foregoing disclosure relates to a restricted number of preferred embodiments of the invention, and is intended to cover all changes and modifications of the examples of the invention herein chosen for the purpose of the disclosure, which do not constitute departures from the spirit and scope of the invention.

I claim:

1. Recording apparatus for fixedly, serially, recording symbols by means of an electromagnetic beam incident upon a movable recording medium sensitive to said beam, along a printline on said recording medium, each symbol being formed by a combination of elementary spots, comprising, in combination, modulating means for forming said elementary spots by controlling the intensity of said beam reaching said recording medium, first means deflecting said beam at an angle with respect to said printline, said first means comprising a disc having a plurality of slots for causing said beam to scan said recording medium forming vertical sections of said symbols, second means deflecting said beam in the direction of the printline for causing said beam to scan said recording medium forming horizontal sections of said symbols and to shift said beam to different symbol positions along said printline, and synchronizing means for synchronizing said first and second deflection means and said modulating means to serially record elementary spots upon said recording medium.

2. Recording apparatus as defined in claim 1 in which said recording medium is photosensitive.

3. Recording apparatus as defined in claim 1 in which said recording medium is thermosensitive.

4. The recording apparatus of claim 1, wherein said recording medium is coated with a toner, and wherein said toner is adapted to be fixed to said medium by said beam at said elementary spots.

5. The recording apparatus of claim 1, wherein said recording medium comprises a print receiving medium and a transfer medium proximate thereto, wherein said elementary spots are recorded on said transfer medium, and further including means for transferring the pattern of said spots from said transfer medium to said print receiving medium.

6. The recording apparatus of claim 1, further including a storage member for storing data representing each symbol to be recorded along said line, and wherein said synchronizing means responds to the data in said storage member and to the instantaneous position of said beam for synchronizing said deflection and modulating means.